US012215657B2

(12) United States Patent
Levinson et al.

(10) Patent No.: US 12,215,657 B2
(45) Date of Patent: Feb. 4, 2025

(54) FUEL PUMP HANGER ASSEMBLY

(71) Applicant: 1340126 Ontario Inc., Markham (CA)

(72) Inventors: Jack Levinson, Onrtario (CA); Rajan Thiru, Ontario (CA)

(73) Assignee: 1340126 Ontario Inc., Markham (CA)

(*) Notice: Subject to any disclaimer, the term of this patent is extended or adjusted under 35 U.S.C. 154(b) by 0 days.

(21) Appl. No.: 18/242,973

(22) Filed: Sep. 6, 2023

(65) Prior Publication Data

US 2024/0077052 A1 Mar. 7, 2024

(30) Foreign Application Priority Data

Sep. 6, 2022 (CA) ................................ CA 3172531

(51) Int. Cl.
*F02M 37/10* (2006.01)

(52) U.S. Cl.
CPC ................................ *F02M 37/103* (2013.01)

(58) Field of Classification Search
CPC .......................... F02M 37/103; F02M 37/106
See application file for complete search history.

(56) References Cited

FOREIGN PATENT DOCUMENTS

AU 364527 S * 10/2015

* cited by examiner

*Primary Examiner* — Jacob M Amick
*Assistant Examiner* — Charles J Brauch
(74) *Attorney, Agent, or Firm* — Christensen, Fonder, Dardi PLLC

(57) ABSTRACT

A fuel pump hanger assembly configured to fit two fuel pumps into the small opening of a fuel tank, even if the diameter of both fuel pumps combined is larger than the opening of the fuel tank. The fuel pumps may be inserted into the fuel tank one at a time, then assembled together through the small opening of the fuel tank. The parts self-locate inside the fuel tank and the assembly held together with bolts. This self-locating feature facilitates the assembly of all parts inside the small opening of the fuel tank. The hanger holds two common fuel pumps and comes with fittings for interfacing to the car's fuel and vapor lines.

11 Claims, 6 Drawing Sheets

FUEL PUMP HANGER ASSEMBLY

RELATED APPLICATIONS

This application claims the benefit of priority to Canadian Application No. 3,172,531, filed Sep. 6, 2022, which is hereby incorporated herein by reference in its entirety.

FIELD OF THE INVENTION

This invention relates to the general field of combustion engines, and more particularly to the field of fuel pumps.

BACKGROUND OF THE INVENTION

As car owners modify their cars with larger turbos and stronger engine internals to support more power, the demands to increase fuel supply go up. In some instances, a larger fuel pump is not enough to increase fuel supply to meet fuel demand. In this case, a $2^{nd}$ fuel pump will be needed to supplement the fuel supply of the $1^{st}$ fuel pump.

SUMMARY OF THE INVENTION

What is desired in one embodiment is a fuel pump hanger assembly configured to fit both fuel pumps into the small opening of a fuel tank, even though the diameter of both fuel pumps combined is larger than the opening of the fuel tank.

Therefore, there is provided a new pump hanger design that will securely hold both fuel pumps in the fuel tank while also having a modular design. This modular design allows both fuel pumps to be inserted into the fuel tank one at a time, then assembled together through the small opening of the fuel tank. The hanger is designed so that all parts self locate inside the fuel tank and is held together with bolts. This self locating feature is necessary to aid with the assembly of all parts inside the small opening of the fuel tank. The hanger holds two common fuel pumps and comes with all the fittings necessary to interface to the car's fuel and vapor lines.

In another embodiment, there is provided a variant pump hanger design for hanging only a single fuel pump.

DETAILED DESCRIPTION OF THE PREFERRED EMBODIMENTS

Figure 1:
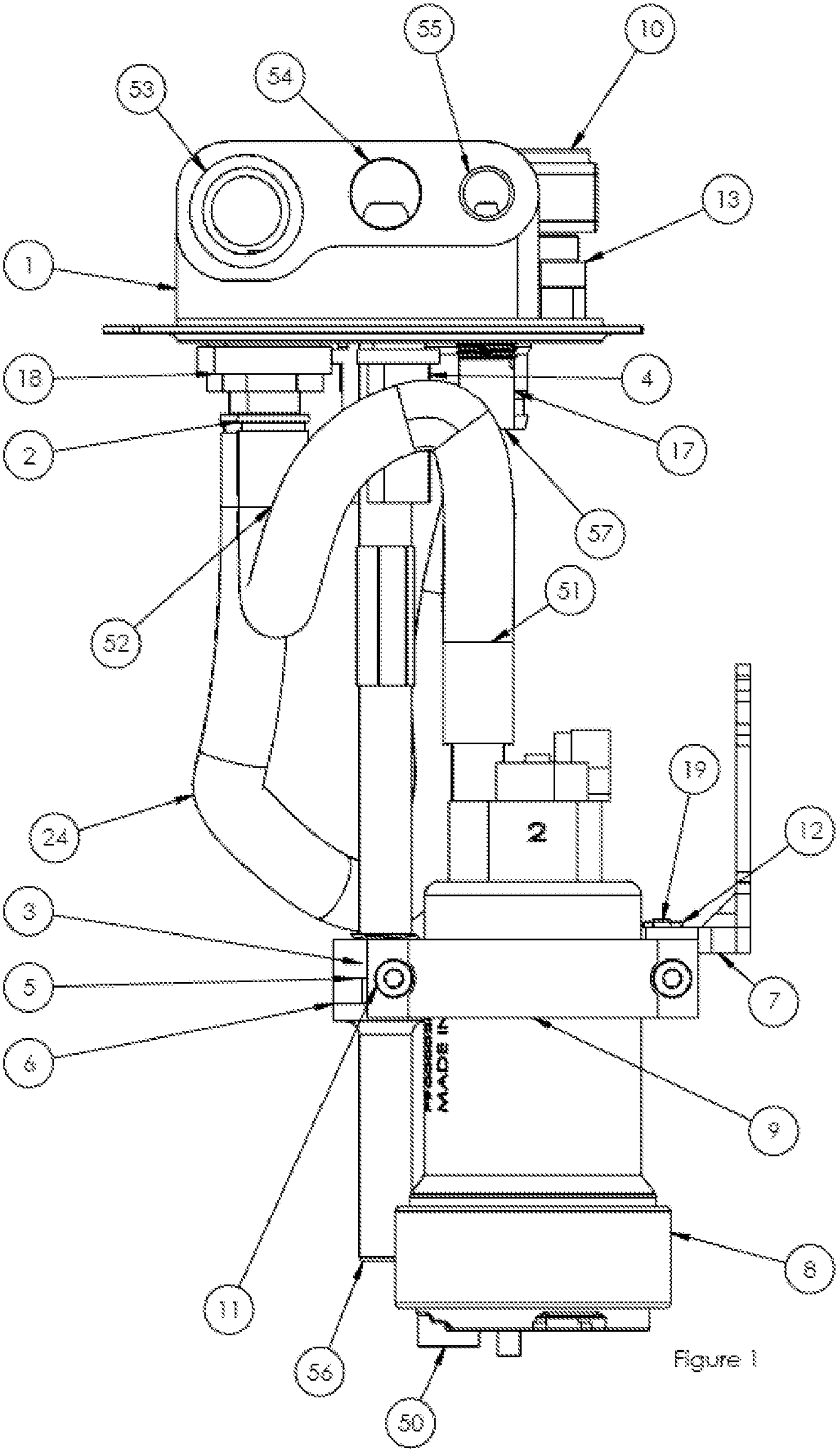
FIG. 1 is a view of the inlet/outlet of the hanger head, and a side profile of the fuel pumps.
Figure 2:
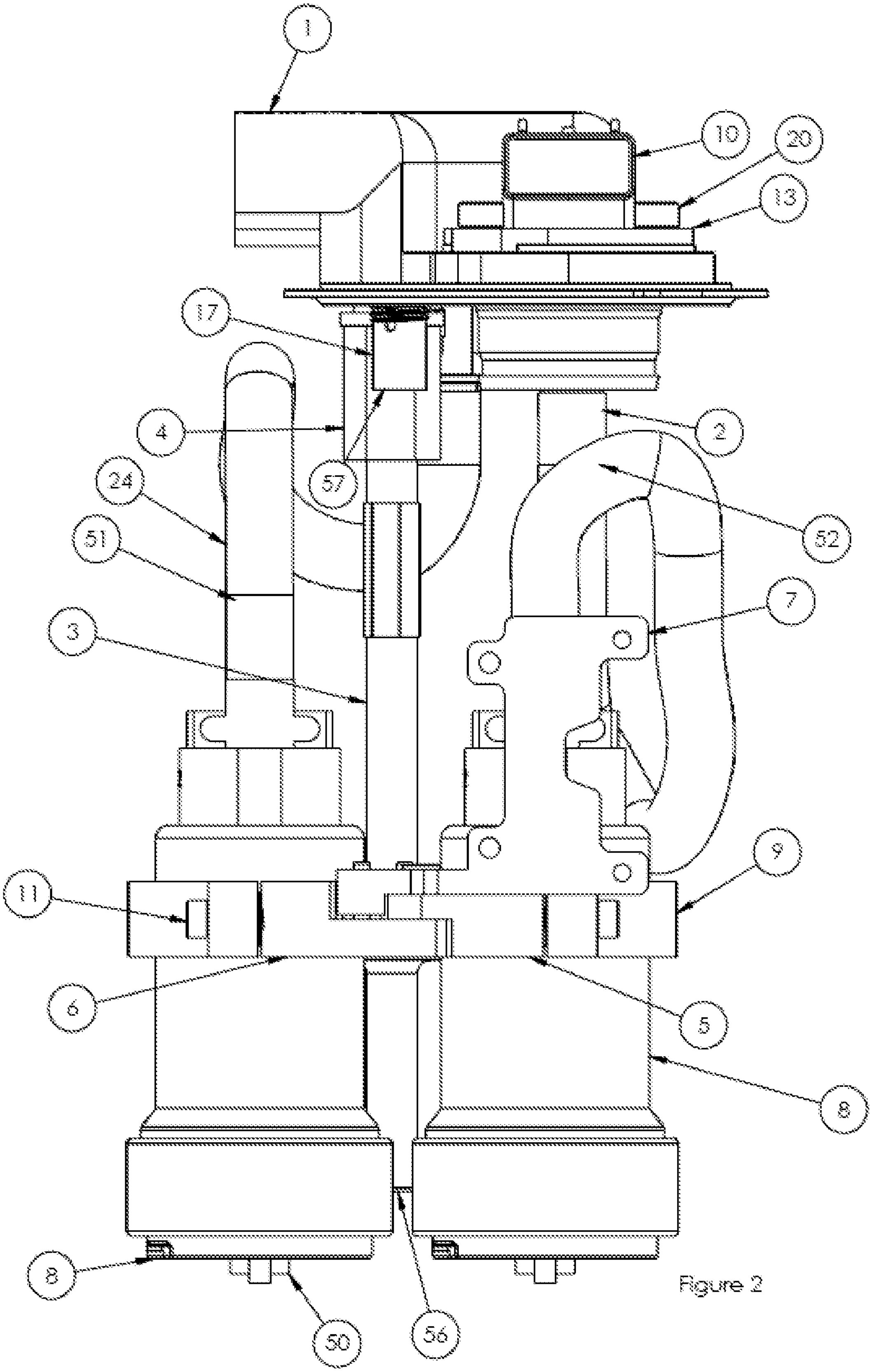
FIG. 2 is a front view of the hanger and shows the side profile of the hanger head.
Figure 3:
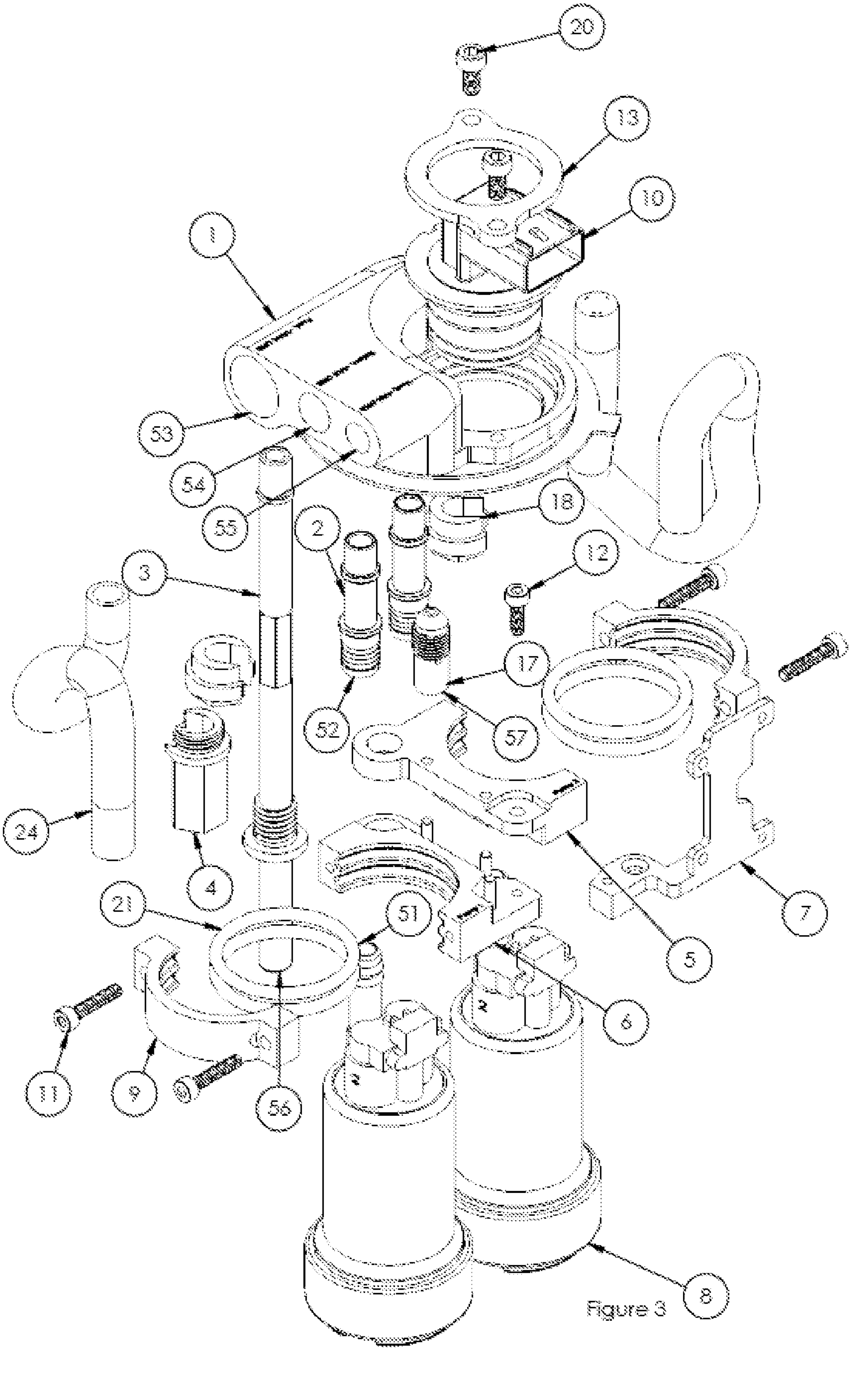
FIG. 3 is an exploded view of the hanger, showing all of the components.

1 is the top hat of the entire fuel pump hanger. It fastens to the fuel tank of the vehicle, fuel feed, return and vent lines which are plumbed to the ports in the top hat. The o-rings 21 are positioned around the fuel pumps 8. The o-rings are then placed into the grooves of brackets 5, 6, & 9. Bolts 11 are used to fasten bracket 9 to bracket 5 & 6. This squeezes and secures the fuel pumps 8 into place, and dampens the vibrations coming from the pumps. The large hole on bracket 6 is slipped over the top of shaft 3, and rests onto the collar on the shaft. The threaded hole on bracket 5 is then slipped over the top of shaft 3. The dowel pins on bracket 6 locates with the corresponding holes on bracket 5. Bracket 5 is then lowered and placed on top of bracket 6. Dowel pins are used for locating bracket 6 and 5 together when assembling everything inside the fuel tank. The thread on shaft 3 then screws into the threaded hole on bracket 5. Bracket 7 holds the fuel level sensor and also secures the front of bracket 5 and 6 together with bolt 12. The last dowel pin on bracket 6 interfaces with the hole on bracket 7. Bolt 12 is inserted into the counterbored hole on bracket 7 and fastens brackets 5,6, & 7 together. The top of shaft 3 is inserted into a hole on top hat 1, and secured using the longer crescent nut 4. 2 is a quick connect fitting that allows the convoluted fuel tubes 24 to feed the top hat. This custom fitting (2) allows for easy assembly in tight spaces as it allows the fuel tubes to be swiveled and positioned easily without binding. 2 is held in place with 18, which is a crescent style nut that allows you to install the threaded nuts over a cylinder that is already pressed into a hole. The vapor-proof electrical bulkhead 10 fits into the large hole on the top of the top hat, it is sealed with an o-ring underneath. Bracket 13 is placed on top of electrical bulkhead 10 and is fastened with bolts 20.

Fuel is sucked into the fuel pumps via inlets 50. Fuel leaves the fuel pumps via port 51 then is fed to port 52 with submersible fuel tubes 24. The fuel then enters a cavity in the top hat and is fed to the fuel line via port 53. Not all fuel will be consumed by the engine, some fuel will be returned back to the fuel tank. The return line from the engine feeds fuel back into the tank via port 54. The fuel then travels down the hollow shaft 3 and exits into the fuel tank via port 56. Fitting 17 is a roll-over check-valve that allows fuel vapor to exit the tank, which prevents the fuel tank from being pressurized as fuel heats and expands in the tank. The roll-over check-valve also prevents fuel from exiting the tank should the vehicle become inverted due to a collision etc. Excess vapor pressure is fed into port 57, enters a cavity in the top hat 1, then exits the top hat via port 55.

Figure 4:
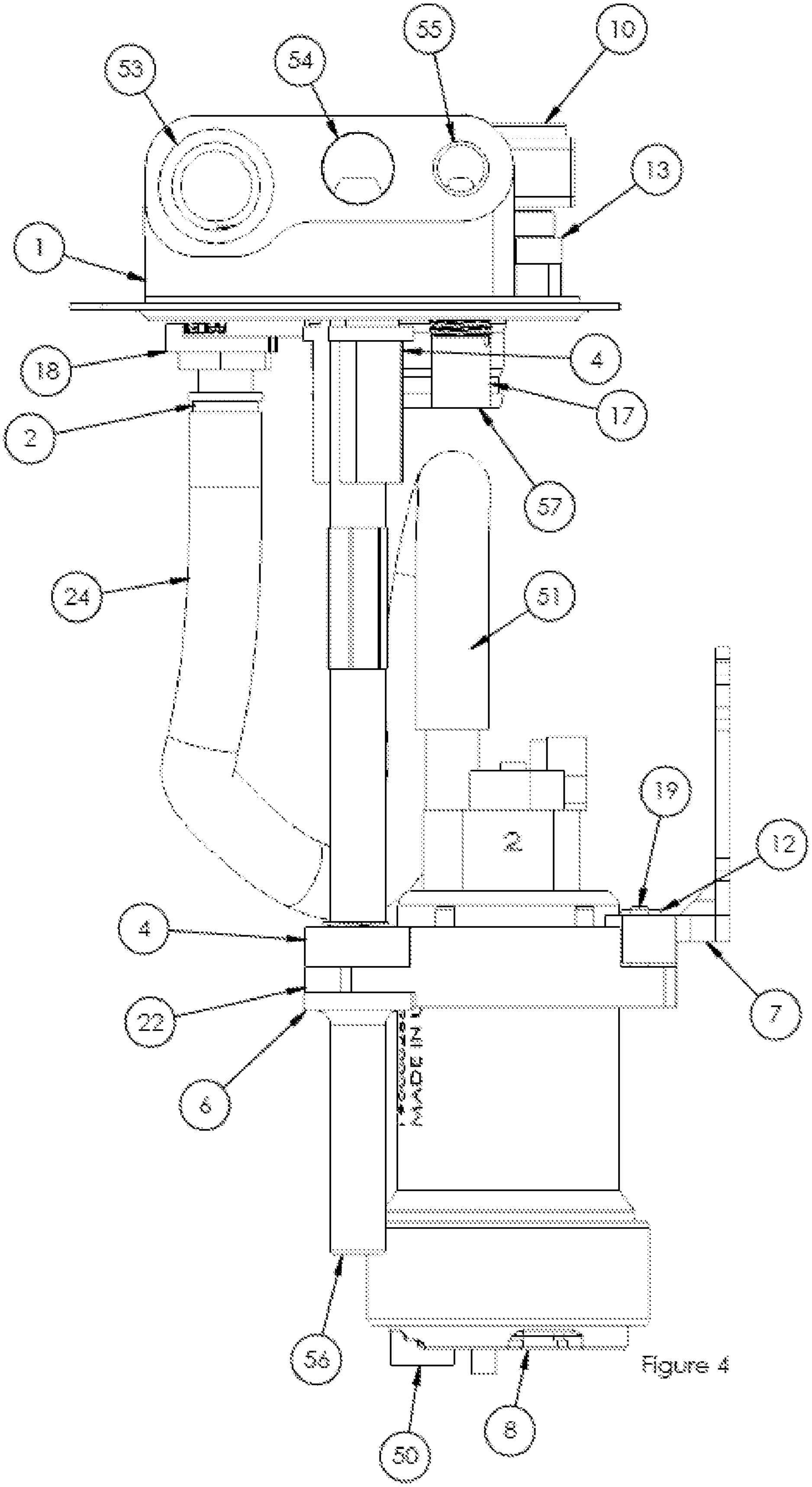
FIG. 4 is a view of the inlet/outlet of the hanger head, and a side profile of the fuel pump, of an alternative embodiment.
Figure 5:
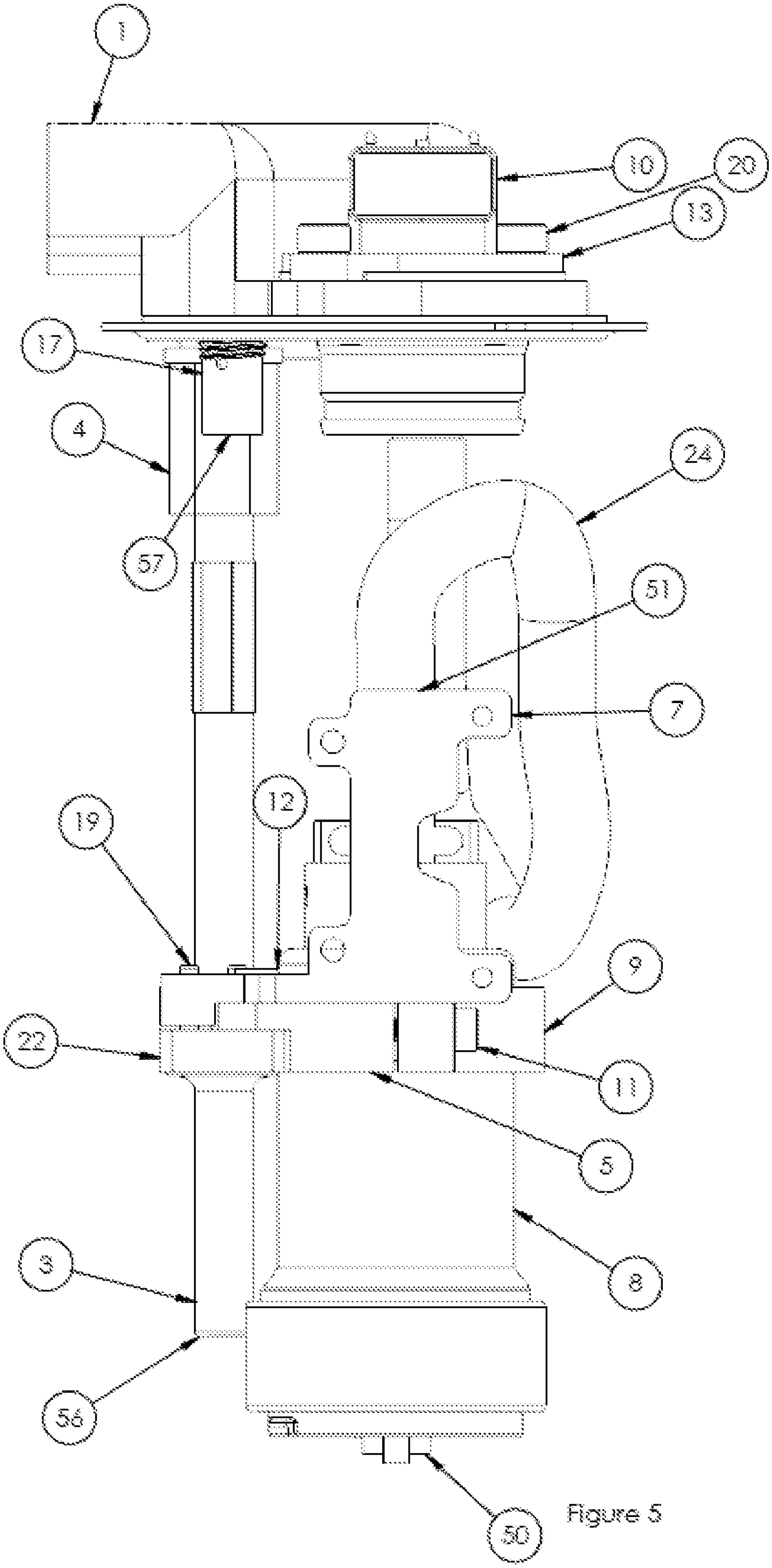
FIG. 5 is a front view of the hanger, and shows the side profile of the hanger head, in an alternative embodiment.
Figure 6:
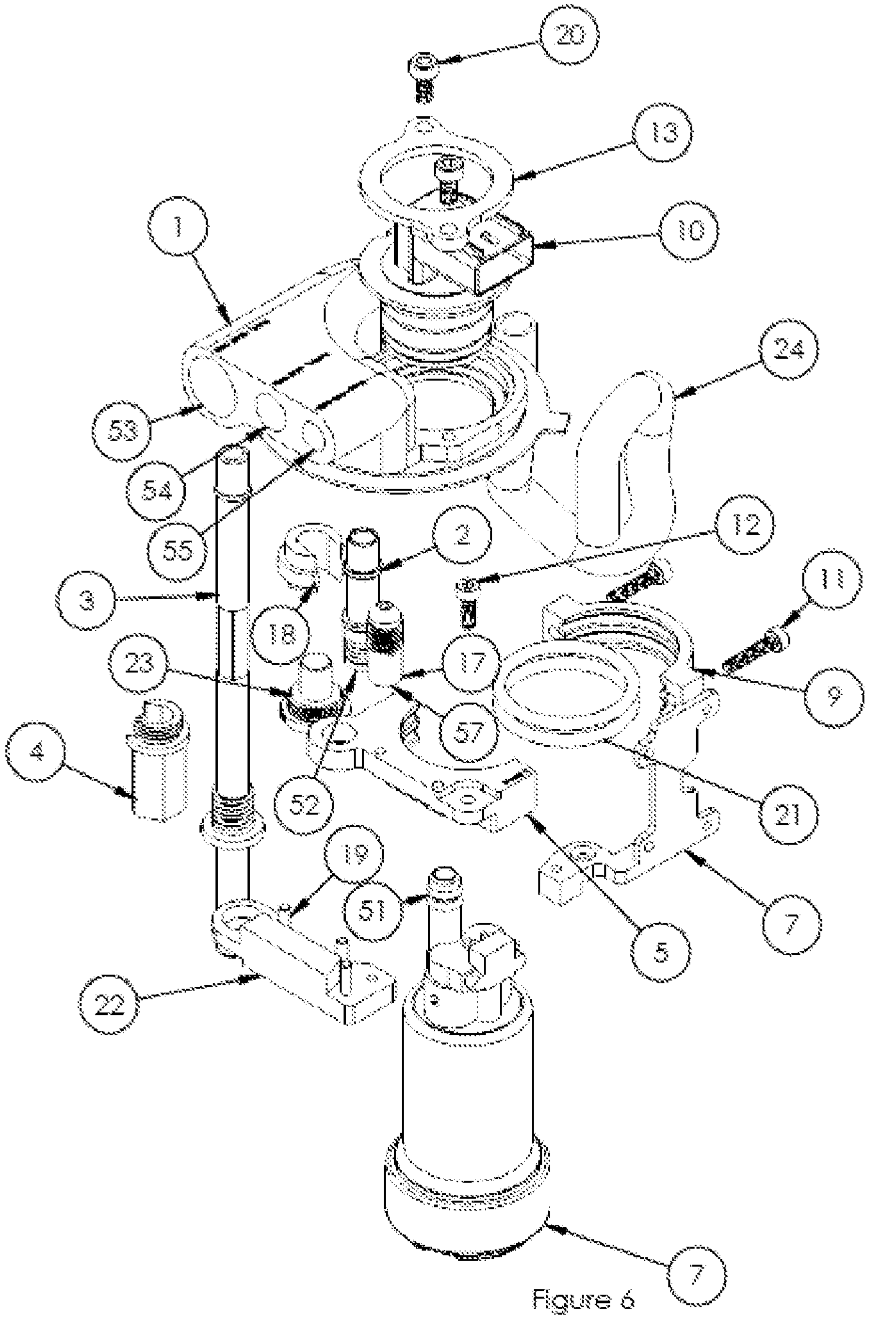
FIG. 6 is an exploded view of the hanger, showing all of the components.

FIGS. 4, 5 and 6 show a different configuration with only one fuel pump instead of two. The change to one fuel pump requires some brackets and fittings to be swapped. Bracket 6 is replaced with Bracket 22. Bracket 22 permits elimination of the $1^{st}$ fuel pump while also maintaining proper spacing so that all the brackets can be assembled together. One of each fitting 2 and 18 is removed from the assembly and replaced with plug 23.

The invention claimed is:

1. A fuel pump hanger comprising:

a top hat to be attached to a fuel tank and positioned at a fuel tank opening of the fuel tank;

an elongate shaft attachable to the top hat so as to extend away from the fuel tank opening into the fuel tank, the elongate shaft having thereon a bracket support that is positioned within the fuel tank when the shaft extends into the fuel tank;

a first bracket assembly, including a first fuel pump bracket for holding a first fuel pump, the first bracket assembly further including a first opening, associated with the first fuel pump bracket, through which the shaft extends to anchor the first fuel pump bracket to the shaft, the first bracket assembly further including a first locating feature; and a second bracket assembly, including a second fuel pump bracket for holding a second fuel pump, the second bracket assembly further including a second opening, associated with the second fuel pump bracket, through which the shaft extends to anchor the second fuel pump bracket to the shaft, the second bracket assembly further including a second locating feature for mating with the first locating feature to locate within the fuel tank the first fuel pump held by the first fuel pump bracket relative to the second fuel pump held by the second fuel pump bracket.

2. A fuel pump hanger as claimed in claim 1, wherein the bracket support comprises a collar on which the first bracket assembly rests.

3. A fuel pump hanger as claimed in claim 1, wherein the second locating feature comprises at least one dowel pin associated with the second bracket assembly, and the first locating feature comprises at least one corresponding hole associated with the first bracket assembly, the at least one dowel pin and corresponding at least one hole are sized, shaped and positioned to mate to position the first fuel pump held by the first fuel pump bracket relative to the second fuel pump held by the second fuel pump bracket.

4. A fuel pump hanger as claimed in claim 2, wherein the at least one dowel pin comprises two dowel pins.

5. A fuel pump hanger as claimed in claim 4, wherein the corresponding at least one hole comprises two holes, one of which corresponds to one of the two dowel pins, and the other of which corresponds to another of the two dowel pins.

6. The fuel pump hanger as claimed in claim 1, wherein the elongate shaft includes a bracket securing feature, and the second bracket assembly includes a shaft securing feature for cooperating with the bracket securing feature to secure the second bracket assembly to the elongate shaft.

7. The fuel pump hanger as claimed in claim 6, wherein the bracket securing feature comprises first threading on a surface of the elongate shaft, and wherein the shaft securing feature comprises corresponding second threading in the second opening to mate with the first threading when the elongate shaft is rotated relative to the second opening to secure the first bracket to the elongate shaft.

8. A method of installing two fuel pumps using the fuel pump hanger of claim 1, the method comprising the steps of:

fastening the first fuel pump to the first bracket using the first bracket assembly;

fastening the second fuel pump to the second bracket using the second bracket assembly;

inserting the elongate shaft into the fuel tank;

placing the first bracket onto the elongate shaft and into the fuel tank by moving the first opening over a top end of the elongate shaft and moving the first bracket downward along the elongate shaft;

after placing the first bracket onto the elongate shaft, placing the second bracket onto the elongate shaft and into the fuel tank by moving the second opening over the top end of the elongate shaft and moving the second bracket downward along the elongate shaft;

mating the first locating feature and the second locating feature;

attaching the elongate shaft to the top hat;

fastening a fuel feed line from each fuel pump to the top hat, fastening a fuel return line from each fuel pump to the top hat, and fastening the top hat to the fuel tank at the fuel tank opening.

9. A method as claimed in claim 8, wherein the second locating feature comprises at least one dowel pin associated with the second bracket assembly, and the first locating feature comprises at least one corresponding hole associated with the first bracket assembly, the at least one dowel pin and corresponding at least one hole are sized, shaped and positioned to mate to position the first fuel pump held by the first fuel pump bracket relative to the second fuel pump held by the second fuel pump bracket.

10. A method as claimed in claim 8, wherein the elongate shaft includes a bracket securing feature, and the second bracket assembly includes a shaft securing feature for cooperating with the bracket securing feature to secure the second bracket assembly to the elongate shaft, and wherein the method further comprises the step of securing the second bracket assembly to the elongate shaft using the bracket securing feature and the shaft securing feature.

11. A method as claimed in claim 10 wherein the bracket securing feature comprises first threading on a surface of the elongate shaft, and wherein the shaft securing feature comprises corresponding second threading in the second opening to mate with the first threading, and wherein the step of securing the second bracket assembly to the elongate shaft comprises rotating the elongate shaft is relative to the second opening to secure the first bracket to the elongate shaft.

* * * * *